(12) United States Patent
Boutros et al.

(10) Patent No.: US 11,394,643 B2
(45) Date of Patent: Jul. 19, 2022

(54) IN-SERVICE SOFTWARE UPGRADE SYSTEMS AND METHODS UTILIZING TWO ROUTER PROCESSORS IN A NETWORK ELEMENT

(71) Applicant: Ciena Corporation, Hanover, MD (US)

(72) Inventors: Sami Boutros, Union City, CA (US); Pranav Mehta, San Jose, CA (US); Jayant Kumar Bhardwaj, Delhi (IN); Michael J. Barnes, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/997,262

(22) Filed: Aug. 19, 2020

(65) Prior Publication Data

US 2022/0014464 A1  Jan. 13, 2022

(30) Foreign Application Priority Data

Jul. 7, 2020 (IN) .............................. 202011028794

(51) Int. Cl.
*H04L 45/00* (2022.01)
*H04L 45/586* (2022.01)
(Continued)

(52) U.S. Cl.
CPC .......... *H04L 45/563* (2013.01); *H04L 45/302* (2013.01); *H04L 45/38* (2013.01); *H04L 45/586* (2013.01); *H04L 67/12* (2013.01)

(58) Field of Classification Search
CPC ..... H04L 45/563; H04L 45/586; H04L 45/38; H04L 67/12; H04L 45/302
See application file for complete search history.

(56) References Cited

U.S. PATENT DOCUMENTS 5,953,314 A * 9/1999 Ganmukhi ........... H04Q 3/5455
370/220
7,646,772 B2    1/2010 Sivabalan et al.
(Continued)

FOREIGN PATENT DOCUMENTS

WO    2019018261 A1    1/2019

OTHER PUBLICATIONS

AT&T, Peng WB HW Group, Open Compute Project, Broadcom J2/Ramon White Boxes components in Distributed Disaggregated Chassis Routing System, Draft 1, Jun. 4-5, 2019, pp. 1-20.
(Continued)

*Primary Examiner* — Yaotang Wang
(74) *Attorney, Agent, or Firm* — Clements Bernard Baratta; Lawrence A. Baratta, Jr.; Christopher L. Bernard

(57) ABSTRACT

A node includes one or more line cards interconnected to one another via a switching fabric and configured to implement a data plane; and a first router processor and a second router processor communicatively coupled to the one or more line cards, and each configured to implement a separate control plane, such that the node appears in a link-state database as two separate nodes. Responsive to an in-service software upgrade, the first router processor is upgraded and down while the second router processor is active, thereby preserving routing and forwarding. The one or more line cards include a first Virtual Local Area Networking (VLAN) for the first router processor and a second VLAN for the second router processor, and the first VLAN and the second VLAN are associated with a same physical interface on the one or more line cards.

20 Claims, 3 Drawing Sheets

(51) Int. Cl.
*H04L 67/12* (2022.01)
*H04L 45/302* (2022.01)

(56) References Cited

U.S. PATENT DOCUMENTS

| | | | |
|---|---|---|---|
| 7,710,899 B1 | 5/2010 | Ward et al. | |
| 9,253,123 B1* | 2/2016 | Podge | H04L 12/4641 |
| 9,548,959 B2 | 1/2017 | Boutros et al. | |
| 9,699,087 B2 | 7/2017 | Boutros et al. | |
| 10,015,066 B2 | 7/2018 | Mishra et al. | |
| 10,091,161 B2 | 10/2018 | Dubey et al. | |
| 10,454,758 B2 | 10/2019 | Boutros et al. | |
| 10,534,601 B1 | 1/2020 | Venkata et al. | |
| 2002/0169794 A1* | 11/2002 | Jones | H04L 45/28 |
| 2003/0218982 A1* | 11/2003 | Folkes | H04L 45/02 |
| | | | 370/238 |
| 2009/0279549 A1* | 11/2009 | Ramanathan | G06F 8/61 |
| | | | 370/395.4 |
| 2012/0320754 A1* | 12/2012 | Zhang | H04L 45/02 |
| | | | 370/238 |
| 2013/0083801 A1* | 4/2013 | Lu | H04L 45/60 |
| | | | 370/401 |
| 2015/0085860 A1 | 3/2015 | Boutros et al. | |
| 2017/0168803 A1 | 6/2017 | Katiyar et al. | |
| 2018/0351857 A1* | 12/2018 | Vairavakkalai | H04L 63/0272 |
| 2019/0020490 A1 | 1/2019 | Boutros et al. | |
| 2019/0020492 A1 | 1/2019 | Boutros et al. | |
| 2019/0020579 A1 | 1/2019 | Boutros et al. | |
| 2019/0327188 A1 | 10/2019 | Rivaud et al. | |
| 2020/0014585 A1 | 1/2020 | Agarwal et al. | |
| 2020/0021521 A1 | 1/2020 | Boutros et al. | |
| 2020/0177500 A1 | 6/2020 | Agarwal et al. | |

OTHER PUBLICATIONS

Nov. 30, 2021, International Search Report and Written Opinion for International Patent Application No. PCT/US2021/040634.

* cited by examiner

IN-SERVICE SOFTWARE UPGRADE SYSTEMS AND METHODS UTILIZING TWO ROUTER PROCESSORS IN A NETWORK ELEMENT

FIELD OF THE DISCLOSURE

The present disclosure generally relates to network devices. More particularly, the present disclosure relates to systems and methods for In-Service Software Upgrade (ISSU) systems and methods utilizing two router processors in a network element.

BACKGROUND OF THE DISCLOSURE

Networks, data centers, cloud infrastructure, etc. are realized ultimately through physical hardware. The physical hardware is used to realize networking, computing, and/or storage functions, including packet switching and the like. Conventionally, there are generally two approaches for how physical hardware is deployed—through a chassis and associated modules or through a rack mounted unit. A chassis-based system includes a chassis with multiple slots and a backplane that supports different modules, line cards, circuit packs, blades, etc. (for simplicity, these are referred to as modules). The chassis-based system allows deployment flexibility where modules as-needed or required are selectively inserted in the chassis. The rack-mounted unit is also referred to as "pizza boxes" and generally includes 1-2 (or more) Rack Unit (RU or simply U and which is a standard unit of measurement of 44.5 mm or 1.75") high completely enclosed form factor. The rack mounted unit differs from a chassis in that all of the hardware is already included as the rack mounted unit is deployed. For example, data centers realize network elements such as in a leaf/spine architecture in a completely decentralized and modular form using rack mounted units. Another type of approach is a combination of the chassis and rack-mounted unit, such as described in commonly assigned U.S. patent application Ser. No. 15/959,746, filed Apr. 23, 2018, and entitled "Modular network element architecture," the contents of which are incorporated by reference herein in their entirety. This combination describes an approach similar to the Distributed Disaggregated Chassis (DDC) white box design for the Open Compute Project (OCP).

A network element can be said to operate a control plane (also may be referred to as a management plane) and a data plane (also may be referred to as a traffic plane, forwarding plane, etc.). The data plane refers to all the functions and processes that forward packets/frames from one interface to another. The control plane refers to all the functions and processes that determine which path to use, e.g., routing protocols, spanning tree, Label Distribution Protocol (LDP), etc. From a hardware perspective, line modules, line cards, data modules, etc. may include ports and switching circuitry for implementing the data plane. A network element can include at least two router processors for implementing the control plane. As described herein, a router processor is a module, device, server, etc. configured to implement the control plane. Other terms in the art for a router processor include a controller, control module, a shelf processor, a router processor, a control plane processor, etc., all are contemplated herein. For description purposes, the term router processor is used herein.

Network elements require periodic software upgrades, updates, etc. while deployed and operational. A key objective during a software upgrade is the data plane remains operational, while the control plane does go down during the operation. Non-Stop Forwarding (NSF) refers to the functionality where a network element remains operational in the data plane during an ISSU. Non-Stop Routing (NSR) refers to a conventional technique to keep the control plane operational, while the router processors are upgraded at the network element. There are issues with conventional NSR techniques. First, NSR implementations are not available for all protocols, by all vendors, on all platforms, etc. Second, NSR adds significant complexity to the protocol implementation, as it requires initial synchronization of state between a primary and backup node protocol software processes, and then would require a continuous synchronization of state between active and backup nodes to maintain the exact control plane state at any time. Third, the complex NSR implementation adds risk to the availability of the protocol software implementation and impacts control plane convergence because of the ongoing synchronization of state between active and backup. Finally, NSR has not been widely deployed by customers.

BRIEF SUMMARY OF THE DISCLOSURE

The present disclosure relates to systems and methods for In-Service Software Upgrade (ISSU) systems and methods utilizing two router processors in a network element. Specifically, the present disclosure includes two router processors in a network element that appear as two separate network elements, each configured to implement a separate control plane. ISSU is achieved with no extensions to the routing protocols by having the network element appear in the Interior Gateway Protocol (IGP) routing domain using existing IGP mechanisms as two network elements (possibly as Primary/Backup nodes or as active/active nodes), both network elements will have exactly the same set of links and build IGP adjacencies to the same set of neighbors, now when one node (router processor) gets upgraded and goes down, the other node (router processor) remains up, and Shortest Path First (SPF) computation performed by all neighbors result in the same Forwarding Information Base (FIB) maintaining NSF. As described herein, the terms node and network element may be used interchangeably, both referring to an entity in a network. The present disclosure provides a novel technique to use existing IGP mechanisms to make a routing node appear in the IGP Link-State Database (LSD) as two routing nodes, so when one of those nodes get upgraded the other node can maintain the control plane sessions to its peers. Advantageously, the approach described herein does not require an NSR implementation and is not subject to the above issues with NSR. In the approach described herein, rather than primary and backup router processors in a routing node, the router processors appear as two different nodes in the IGP domain having the same set of links and the same set of neighbors.

In an embodiment, a node includes one or more line cards interconnected to one another via a switching fabric and configured to implement a data plane; and a first router processor and a second router processor communicatively coupled to the one or more line cards, and each configured to implement a separate control plane, such that the node appears in a link-state database as two separate nodes. The node can further include one or more fabric nodes configured to implement the switching fabric. Responsive to an in-service software upgrade, the first router processor can be upgraded and down while the second router processor can be active, thereby preserving routing and forwarding. The one or more line cards can include a first Virtual Local Area Networking (VLAN) for the first router processor and a second VLAN for the second router processor, and wherein the first VLAN and the second VLAN can be associated with a same physical interface on the one or more line cards. Adjacencies with neighbors connected to the one or more line cards can be built using the first VLAN for the first router processor and the second VLAN for the second router processor. The separate control planes can each have a same set of links with the first VLAN and the second VLAN being different. The data plane can perform Equal-Cost Multi-Path routing between both the first VLAN and the second VLAN. The data plane can perform one of (i) UCMP routing between both the first VLAN and the second VLAN and (ii) all routing to the first VLAN when it is active with the second VLAN as standby. For the two separate nodes, each of the first router processor and the second router processor can be configured with a different router identifier.

In another embodiment, a non-transitory computer-readable medium includes instructions stored thereon for programming one or more devices to perform steps of operating a data plane over one or more line cards, associated with a node, interconnected to one another via a switching fabric; and implementing two control planes for the node via a first router processor and a second router processor communicatively coupled to the one or more line cards, such that the node appears in a link-state database as two separate nodes. The steps cam further include performing an in-service software upgrade where the first router processor is upgraded and down while the second router processor is active, thereby preserving routing and forwarding. The one or more line cards can include a first Virtual Local Area Networking (VLAN) for the first router processor and a second VLAN for the second router processor, and wherein the first VLAN and the second VLAN can be associated with a same physical interface on the one or more line cards. Adjacencies with neighbors connected to the one or more line cards can be built using the first VLAN for the first router processor and the second VLAN for the second router processor. The separate control planes can each have a same set of links with the first VLAN and the second VLAN being different. The data plane can perform Equal-Cost Multi-Path routing between both the first VLAN and the second VLAN.

In a further embodiment, a method includes operating a data plane over one or more line cards, associated with a node, interconnected to one another via a switching fabric; and implementing two control planes for the node via a first router processor and a second router processor communicatively coupled to the one or more line cards, such that the node appears in a link-state database as two separate nodes. The method can further include performing an in-service software upgrade where the first router processor is upgraded and down while the second router processor is active, thereby preserving routing and forwarding. The one or more line cards can include a first Virtual Local Area Networking (VLAN) for the first router processor and a second VLAN for the second router processor, and wherein the first VLAN and the second VLAN can be associated with a same physical interface on the one or more line cards. Adjacencies with neighbors connected to the one or more line cards can be built using the first VLAN for the first router processor and the second VLAN for the second router processor. The separate control planes can each have a same set of links with the first VLAN and the second VLAN being different.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Again, the present disclosure relates to systems and methods for In-Service Software Upgrade (ISSU) systems and methods utilizing two router processors in a network element. Specifically, the present disclosure includes two router processors in a network element, each configured to implement a separate control plane, that appear as two separate network elements. ISSU is achieved with no extensions to the routing protocols by having the network element appear in the Interior Gateway Protocol (IGP) routing domain using existing IGP mechanisms as two network elements (possibly as Primary/Backup nodes or as active/ active nodes), both network elements will have exactly the same set of links and build IGP adjacencies to the same set of neighbors, now when one node (router processor) gets upgraded and goes down, the other node (router processor) remains up, and Shortest Path First (SPF) computation performed by all neighbors result in the same Forwarding Information Base (FIB) maintaining NSF. As described herein, the terms node and network element may be used interchangeably, both referring to an entity in a network. The present disclosure provides a novel technique to use existing IGP mechanisms to make a routing node appear in the IGP Link-State Database (LSD) as two routing nodes, so when one of those nodes get upgraded the other node can maintain the control plane sessions to its peers. Advantageously, the approach described herein does not require an NSR implementation and is not subject to the above issues with NSR. In the approach described herein, rather than primary and backup router processors in a routing node, the router processors appear as two different nodes in the IGP domain having the same set of links and the same set of neighbors.

The following acronyms/abbreviations are utilized herein:

| | |
|---|---|
| DDC | Distributed Disaggregated Chassis |
| ECMP | Equal-Cost Multi-Path routing |
| FIB | Forwarding Information Base |
| FN | A router pizza box implementing Fabric Node function |
| IGP | Interior Gateway Protocol |
| IP | Internet Protocol |
| ISSU | In-Service Software Upgrade |
| LC | A router pizza box implementing Line Card (LC) function |
| LDP | Label Distribution Protocol |
| LSA | Link-State Advertisement |
| LSD | Link-State Database |
| NBR | Neighbor Router |
| NSF | Non-Stop Forwarding |
| NSR | Non-Stop Routing |
| OCP | Open Compute Project |
| p2p | Point-to-Point |
| RP | Router Processor server running a typically Routing control plane |
| RU | Rack Unit |
| SPF | Shortest Path First |

-continued

| | |
|---|---|
| VLAN | Virtual Local Area Network identifier identifying a virtual ethernet service on an ethernet port |
| VRF | Virtual Routing and Forwarding Function |

Example Node

Figure 1:
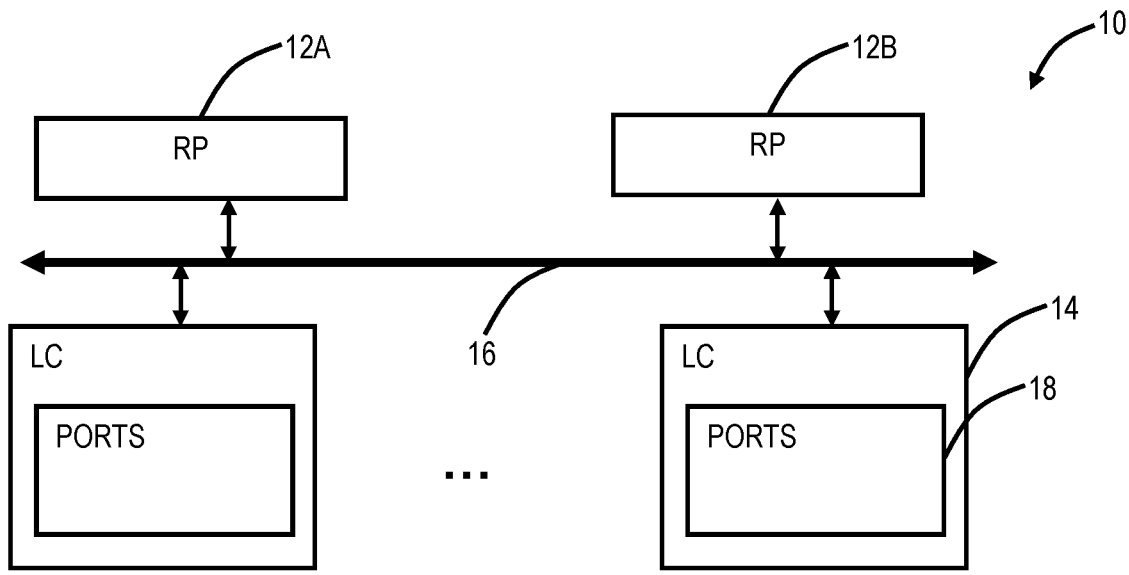
FIG. 1 is a block diagram of an example implementation of a node.

FIG. 1 is a block diagram of an example implementation of a node 10. Those of ordinary skill in the art will recognize FIG. 1 is a functional diagram in an oversimplified manner, and a practical embodiment may include additional components and suitably configured processing logic to support known or conventional operating features that are not described in detail herein. In an embodiment, the node 10 is a packet switch, but those of ordinary skill in the art will recognize the systems and methods described herein can operate with other types of network elements and other implementations. In this embodiment, the node 10 includes a plurality of modules 12, 14 interconnected via an interface 16. The modules 12, 14 are also known as blades, line cards, line modules, circuit packs, pluggable modules, etc. and generally refer to components mounted on a chassis, shelf, etc. of a data switching device, i.e., the node 10.

Also, the modules 12, 14 can be rack-mounted units or "pizza boxes." Various hardware implementations are contemplated. Specifically, the term module 12, 14 is meant to cover any hardware implementation. Each of the modules 12, 14 can include numerous electronic devices and/or optical devices mounted on a circuit board along with various interconnects, including interfaces to the chassis, shelf, etc. Further, the node 10 can be configured as a single "shelf" or multiple "shelves." Also, those skilled in the art will recognize the term shelf can refer to a chassis, a rack-mounted unit (pizza box), etc. The node 10 is a single entity from a network management, Operations, Administration, Maintenance, and Provisioning (OAM&P), control plane, etc. perspective.

Figure 2:
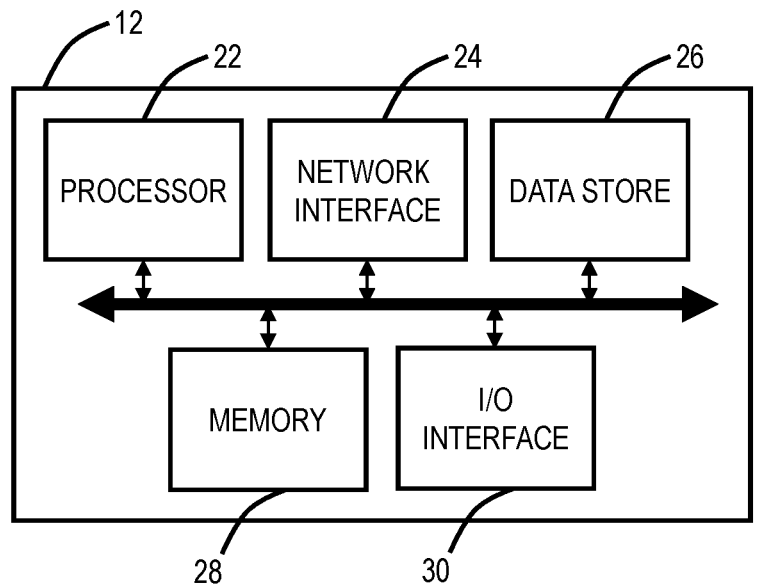
FIG. 2 is a block diagram of an example router processor, which can be used in the node of FIG. 1.

Two example modules 12, 14 are illustrated with router processors 12A, 12B and line card 14. The router processors 12A, 12B can include a microprocessor, memory, software, and a network interface, and an example implementation is shown in FIG. 2. Specifically, the microprocessor, the memory, and the software can collectively control, configure, provision, monitor, etc. the node 10, for the control plane, for OAM&P, etc. Additionally, the router processors 12A, 12B can include a database that tracks and maintains provisioning, configuration, operational data, and the like. For example, the router processors 12A, 12B can maintain dynamic system information including forwarding databases, FIB, protocol state machines, the operational status of the ports 18, and the like. Again, conventionally, the router processors 12A, 12B operate in a redundant or protected configuration such as 1:1, 1+1, active/standby, etc. In the present disclosure, both the router processors 12A, 12B are active, each appearing as a different node 10 to the control plane. That is, the node 10 appears as two identical nodes based on the router processors 12A, 12B. The node 10, in the approach described herein, is two entities from a network management, OAM&P, control plane, etc. perspective. As such, it is possible to perform ISSU without NSR as one router processor 12A, 12B can be updated while the other router processor 12A, 12B is active.

The line card 14 includes ports 18, such as a plurality of physical ports disposed on an exterior of the line card 14 02 for receiving ingress/egress connections. Additionally, the line card 14 can include switching components to form a switching fabric via the interface 16 between all of the ports 18, allowing data traffic (i.e., packets) to be switched/forwarded between the ports 18 on the various line cards 14. The switching fabric is a combination of hardware, software, firmware, etc. that moves data coming into the node 10 out by the correct port 18 to the next node 10. "Switching fabric" includes switching units in a node; integrated circuits contained in the switching units; and programming that allows switching paths to be controlled. Note, the switching fabric can be distributed on the modules 14, in a separate module (illustrated in FIG. 3 as a fabric node), integrated on the line module 14, a combination thereof, or the like.

Again, those of ordinary skill in the art will recognize the node 10 can include other components which are omitted for illustration purposes, and that the systems and methods described herein are contemplated for use with a plurality of different network elements with the node 10 presented as an example type of network element. For example, in another embodiment, the node 10 may include corresponding functionality in a distributed fashion. In a further embodiment, the chassis and modules may be a single integrated unit, namely a rack-mounted shelf where the functionality of the modules 12, 14 is built-in, i.e., a "pizza-box" configuration. That is, FIG. 1 is meant to provide a functional view, and those of ordinary skill in the art will recognize actual hardware implementations may vary.

Example Router Processor

FIG. 2 is a block diagram of an example router processor 12, which can be used in the node 10. The router processor 12 can be part of the node 10, or a stand-alone device communicatively coupled to the node 10. Also, the router processor 12 can be referred to in implementations as a controller, a control module, a shelf controller, a shelf processor, a system controller, etc. The router processor 12 can include a processor 22, which is a hardware device for executing software instructions. The processor 22 can be any custom made or commercially available processor, a central processing unit (CPU), an auxiliary processor among several processors associated with the router processor 12, a semiconductor-based microprocessor (in the form of a microchip or chipset), or generally any device for executing software instructions. When the router processor 12 is in operation, the processor 22 is configured to execute software stored within the memory, to communicate data to and from the memory, and to generally control operations of the router processor 12 pursuant to the software instructions. The router processor 12 can also include a network interface 24, a data store 26, memory 28, an I/O interface 30, and the like, all of which are communicatively coupled to one another and to the processor 22.

The network interface 24 can be used to enable the router processor 12 to communicate on a data communication network, such as to communicate to a management system, to a Software-Defined Networking (SDN) controller, and the like. The network interface 24 can include, for example, an Ethernet module. The network interface 24 can include address, control, and/or data connections to enable appropriate communications on the network. The data store 26 can be used to store data, such as control plane information, provisioning data, OAM&P data, etc. The data store 26 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 26 can incorporate electronic, magnetic, optical, and/or other types of storage media. The memory 28 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 28 may incorporate electronic, magnetic, optical, and/or other types of storage media. Note that the memory 28 can have a distributed architecture, where various components are situated remotely from one another, but may be accessed by the processor 22. The I/O interface 30 includes components for the router processor 12 to communicate with other devices, such as direct interfaces.

Distributed Disaggregated Chassis (DDC)

Figure 3:
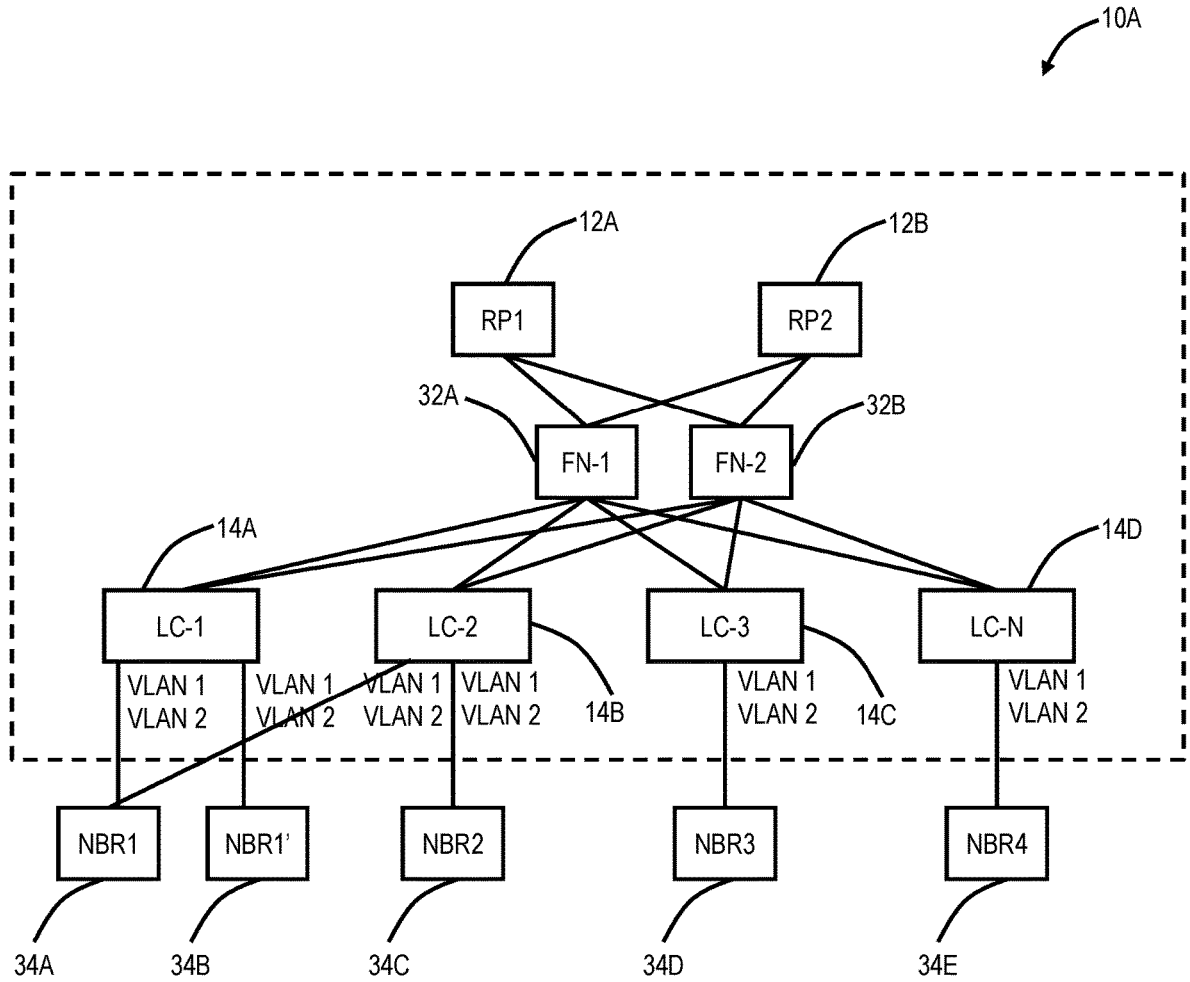
FIG. 3 is a block diagram of an example implementation of a node in a Distributed Disaggregated Chassis (DDC) configuration.

FIG. 3 is a block diagram of an example implementation of a node 10A in a Distributed Disaggregated Chassis (DDC) configuration. The node 10A is a specific implementation of a network element where the router processors 12, the line cards 14, and fabric nodes 32 are in different rack-mounted units or pizza boxes. In the example of FIG. 3, there are two router processors 12A, 12B, four line cards 14A, 14B, 14C, 14D, and two fabric nodes 32A, 32B. Of course, other implementations are contemplated. Note, the line cards 14 can be any number, such as up to N cards. The fabric nodes 32 can provide the switching fabric between the line cards 14.

ISSU with the DDC

The following description utilizes the node 10A in the DDC configuration for describing the ISSU approach with the two active router processors 12A, 12B. Those skilled in the art will appreciate this ISSU approach can apply to the generalized node 10 or any other network element. Again, ISSU is a key feature that allows a service provider to upgrade router nodes 10, 10A without impacting services. Again, to support ISSU, many routing protocols have been extended to support NSR, for maintaining sessions and routing state across primary and backup routing processors 12 running the routing protocol instance for ISSU with no impact on the service. The NSR implementation added complexity to the routing protocol implementations and increased the risk to the availability of those protocols.

In the present disclosure, a new simpler mechanism to achieve ISSU without the added complexity of the NSR implementation is proposed. ISSU will be achieved with no extensions to the routing protocols by having the node 10, 10A appear in the IGP routing domain using existing IGP mechanisms as two nodes (possibly as Primary/Backup nodes or as active/active nodes), both nodes will have exactly the same set of links and will build IGP adjacencies to the same set of neighbors 34 (labeled NBR1 34A, NBR1' 34B, NBR2 34C, NBR3 34D, NBR4 32E), now when one node gets upgraded and goes down the other node remains up, and SPF computation performed by all neighbors 34 will result in the same FIB maintaining NSF. The novelty of the approach is how to use existing IGP mechanisms to make a routing node 10, 10A appear in an IGP Link-State Database as two routing nodes, so when one of those nodes get upgraded the other node can maintain the control plane sessions to its peers. That is, the node 10, 10A appears as two nodes in a network, with different IP/router identifiers.

In the node 10A, VLAN1 and VLAN2 are illustrated, for example, associated with the IGP protocol, running in the corresponding VRF table. Note, the terms VLAN1, VLAN2 are presented for illustration purposes, and these can be any value to differentiate between one another. As is described herein, one VLAN (e.g., VLAN1) is associated with the router processor 12A, and another VLAN (e.g., VLAN2) is associated with the router processor 12B. Any packets received on VLAN1 or VLAN2 will be looked up in the same VRF table by all line cards 14 and neighbors 34.

Using existing IGP mechanisms:

The router processors 12A, 12B appear as two nodes in the IGP Link-State Database. As is known in the are LSAs are provided to describe the network topology and each node 10, 10A stores the received LSAs in the Link-State Database.

The router processor 12A builds adjacencies with the neighbors 34 using the VLAN1, and the router processor 12B builds adjacencies with the neighbors 34 using the VLAN 2.

Note, assuming p2p VLAN interfaces for the VLAN1, VLAN2, i.e., no intermediate devices between the line cards 14 and the neighbors 34, it is possible to use unnumbered interfaces for connectivity to the neighbors 34. An unnumbered interface is one that does not have an explicit IP address assigned and is configured to "borrow" the IP address of another interface on the node 10, 10A.

The neighbors 34 will perform SPF computation using the VLAN1 or VLAN 2 as the next-hop interface. As such, if the router processor 12A is down during an ISSU, the neighbors 34 will recompute and use the VLAN2 as the next-hop interface.

NSF is always maintained since both VLAN1 and VLAN2 can be used to forward traffic without impacting forwarding.

Also, a key advantage is there is no need to upgrade or specially configure the neighbors 34 to support this approach. The neighbors 34 can reach the node 10, 10A via the VLAN1 or the VLAN2, which to it appears as different links, but are actually the same. Note, the router processors 12A, 12B each appear as a separate node, i.e., separate control plane instances for the same node 10, 10A. However, there is only one data plane instance operating on the line cards 14. The use of the VLAN1, VLAN2 allows separation of the data plane instance between the separate control plane instances.

Both the active router processors 12A, 12B receive the same set of LSAs and compute the same set of routes. However, one router processor 12A will set up the data plane to reach the neighbors 34 via one VLAN (e.g., VLAN1) while the other router processor 12B will set up via the other VLAN (e.g., VLAN2). The data plane can ECMP traffic via both VLANs to reach the neighbor 34, and the neighbors 34 as well can ECMP traffic to both VLANs associated with the same physical interface on the line cards 14.

Upgrade or Failure of One of the Router Processors

When there is an upgrade or failure of a router processor, e.g., the router processor 12A, the route paths associated with this router processor control plane are deleted from the data plane line card 14. However, the other route paths learned from the other router processor control plane, e.g., the router processor 12B, remain, and there is no impact to traffic forwarding to the neighbors 34.

As such, ISSU is achieved with no extensions to the routing protocols by having the node 10, 10A appear in the IGP routing domain using existing IGP mechanisms as two nodes, for the router processor 12A, 12B (possibly as Primary/Backup nodes or as active/active nodes). Again, both nodes have the same set of links and build IGP adjacencies to the same set of neighbors 34. When one node (router processor 12A) gets upgraded and goes down, the other node (router processor 12B) remains up, and the SPF computation performed by all the neighbors 34 results in the same FIB maintaining NSF.

Differences with Existing NSR and NSF

Again, the two router processors 12A, 12B approach described herein eliminates the need for the node 10, 10A to implement NSR or NSF. With both the present approach and NSR, there is only one data plane instance on the line cards 14. With the present approach, both active router processors 12A, 12B will receive the same set of LSAs and will compute the same set of routes, however one router processor 12A, 12B will setup the data plane to reach the neighbors 34 via one VLAN while the other will set up to go via another VLAN. The data plane can ECMP traffic to via both VLANs to reach the neighbor 34, and the neighbors 34 as well can ECMP traffic to both VLANs associated with the same physical interface on the line card 14.

The ECMP can be 50/50 or can be a different percentage, or only one VLAN can be active and the other standby, all will depend on the cost advertised by the router processors 12A, 12B routing control plane.

Separate Control Plane Process

Figure 4:
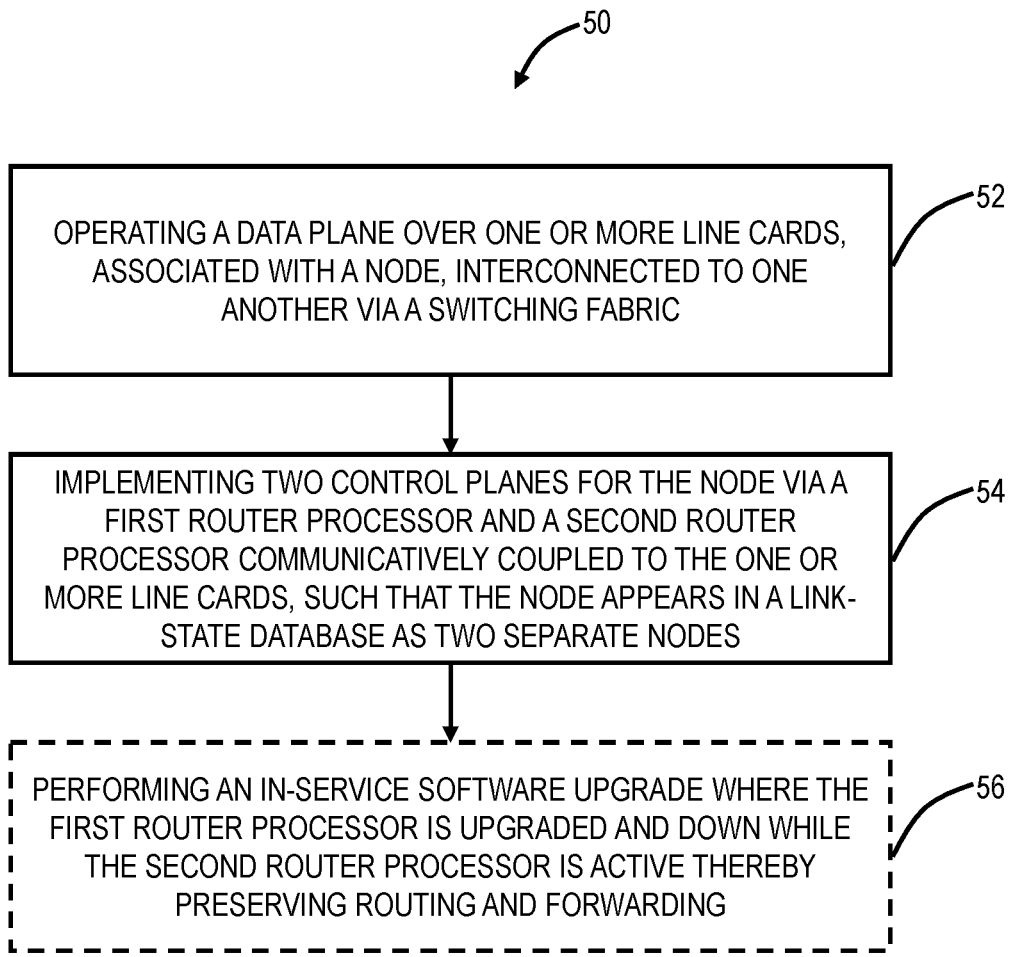
FIG. 4 is a flowchart of a process for using the two router processors of FIG. 2 to implement two separate control planes for the nodes of FIG. 1 and FIG. 3.

FIG. 4 is a flowchart of a process 50 for using the two router processors 12A, 12B to implement two separate control planes for the node 10, 10A. The process 50 contemplates implementation by the node 10, 10A as a method as well as a non-transitory computer-readable medium having instructions stored thereon for programming one or more devices in the nodes 10, 10A to perform steps.

The steps include operating a data plane over one or more line cards, associated with a node, interconnected to one another via a switching fabric (step 52); and implementing two control planes for the node via a first router processor and a second router processor communicatively coupled to the one or more line cards, such that the node appears in a link-state database as two separate nodes (step 54). The steps can further include performing an in-service software upgrade where the first router processor is upgraded and down while the second router processor is active, thereby preserving routing and forwarding (step 56).

The one or more line cards can include a first Virtual Local Area Networking (VLAN) for the first router processor and a second VLAN for the second router processor, and wherein the first VLAN and the second VLAN are associated with a same physical interface on the one or more line cards. Adjacencies with neighbors connected to the one or more line cards can be built using the first VLAN for the first router processor and the second VLAN for the second router processor. The separate control planes can each have the same set of links with the first VLAN and the second VLAN being different. The data plane can perform Equal-Cost Multi-Path routing to both the first VLAN and the second VLAN.

In another embodiment, the node 10, 10A includes one or more line cards 14 interconnected to one another via a switching fabric and configured to implement a data plane; and a first router processor 12A and a second router processor 12B communicatively coupled to the one or more line cards 14, and each configured to implement a separate control plane, such that the node 10, 10A appears in a link-state database as two separate nodes. The node 10, 10A can further include one or more fabric nodes 32 configured to implement the switching fabric.

Responsive to an in-service software upgrade, the first router processor 12A is upgraded and down while the second router processor 12B is active, thereby preserving routing and forwarding.

The one or more line cards 14 can include a first Virtual Local Area Networking (VLAN) for the first router processor 12A and a second VLAN for the second router processor 12B, and wherein the first VLAN and the second VLAN are associated with a same physical interface on the one or more line cards 14. Adjacencies with neighbors 34 connected to the one or more line cards 14 can be built using the first VLAN for the first router processor 12A and the second VLAN for the second router processor 12B.

The separate control planes can each have the same set of links with the first VLAN and the second VLAN being different. The data plane can perform Equal-Cost Multi-Path routing to both the first VLAN and the second VLAN. The data plane can also perform one of (i) Unequal-Cost Multiple Path (UCMP) routing between both the first VLAN and the second VLAN and (ii) all routing to the first VLAN when it is active with the second VLAN as standby.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A node comprising:
one or more line cards interconnected to one another via a switching fabric and configured to implement a data plane; and
a first router processor and a second router processor communicatively coupled to the one or more line cards, and each configured to implement a separate control plane, such that the node appears in a link-state database as two separate nodes that have a same set of links in the associated link-state database and that builds adjacencies to a same set of neighbors, wherein there is no synchronization between the first router processor and the second router processor.

2. The node of claim 1, further comprising one or more fabric nodes configured to implement the switching fabric.

3. The node of claim 1, wherein, responsive to an in-service software upgrade, the first router processor is upgraded and down while the second router processor is active, thereby preserving routing and forwarding.

4. The node of claim 1, wherein the one or more line cards include a first Virtual Local Area Networking (VLAN) for the first router processor and a second VLAN for the second router processor, and wherein the first VLAN and the second VLAN are associated with a same physical interface on the one or more line cards.

5. The node of claim 4, wherein adjacencies with neighbors connected to the one or more line cards are built using the first VLAN for the first router processor and the second VLAN for the second router processor.

6. The node of claim 4, wherein the separate control planes each have a same set of links with the first VLAN and the second VLAN being different.

7. The node of claim 4, wherein the data plane performs Equal-Cost Multi-Path routing between both the first VLAN and the second VLAN.

8. The node of claim 4, wherein the data plane performs one of (i) UCMP routing between both the first VLAN and the second VLAN and (ii) all routing to the first VLAN when it is active with the second VLAN as standby.

9. The node of claim 1, wherein, for the two separate nodes, each of the first router processor and the second router processor are configured with a different router identifier.

10. A non-transitory computer-readable medium having instructions stored thereon for programming one or more devices to perform steps of:
operating a data plane over one or more line cards, associated with a node, interconnected to one another via a switching fabric; and
implementing two control planes for the node via a first router processor and a second router processor communicatively coupled to the one or more line cards, such that the node appears in a link-state database as two separate nodes that have a same set of links in the associated link-state database and that builds adjacencies to a same set of neighbors, wherein there is no synchronization between the first router processor and the second router processor.

11. The non-transitory computer-readable medium of claim 10, wherein the steps further include
performing an in-service software upgrade where the first router processor is upgraded and down while the second router processor is active, thereby preserving routing and forwarding.

12. The non-transitory computer-readable medium of claim 10, wherein the one or more line cards include a first Virtual Local Area Networking (VLAN) for the first router processor and a second VLAN for the second router processor, and wherein the first VLAN and the second VLAN are associated with a same physical interface on the one or more line cards.

13. The non-transitory computer-readable medium of claim 12, wherein adjacencies with neighbors connected to the one or more line cards are built using the first VLAN for the first router processor and the second VLAN for the second router processor.

14. The non-transitory computer-readable medium of claim 12, wherein the separate control planes each have a same set of links with the first VLAN and the second VLAN being different.

15. The non-transitory computer-readable medium of claim 14, wherein the data plane performs Equal-Cost Multi-Path routing between both the first VLAN and the second VLAN.

16. A method comprising:
operating a data plane over one or more line cards, associated with a node, interconnected to one another via a switching fabric; and
implementing two control planes for the node via a first router processor and a second router processor communicatively coupled to the one or more line cards, such that the node appears in a link-state database as two separate nodes that have a same set of links in the associated link-state database and that builds adjacencies to a same set of neighbors, wherein there is no synchronization between the first router processor and the second router processor.

17. The method of claim 16, further comprising
performing an in-service software upgrade where the first router processor is upgraded and down while the second router processor is active, thereby preserving routing and forwarding.

18. The method of claim 16, wherein the one or more line cards include a first Virtual Local Area Networking (VLAN) for the first router processor and a second VLAN for the second router processor, and wherein the first VLAN and the second VLAN are associated with a same physical interface on the one or more line cards.

19. The method of claim 18, wherein adjacencies with neighbors connected to the one or more line cards are built using the first VLAN for the first router processor and the second VLAN for the second router processor.

20. The method of claim 18, wherein the separate control planes each have a same set of links with the first VLAN and the second VLAN being different.

* * * * *